No. 759,314. PATENTED MAY 10, 1904.
H. G. ROSSLOW.
EXPOSURE INDEX FOR PHOTOGRAPHIC PLATE HOLDERS.
APPLICATION FILED OCT. 23, 1903.
NO MODEL.

Witnesses:
Fred. C. Pugh
E. D. Doyle

Inventor:
Henry G. Rosslow

No. 759,314.

Patented May 10, 1904.

UNITED STATES PATENT OFFICE.

HENRY G. ROSSLOW, OF SPOKANE, WASHINGTON.

EXPOSURE-INDEX FOR PHOTOGRAPHIC-PLATE HOLDERS.

SPECIFICATION forming part of Letters Patent No. 759,314, dated May 10, 1904.

Application filed October 23, 1903. Serial No. 178,205. (No model.)

*To all whom it may concern:*

Be it known that I, HENRY G. ROSSLOW, a citizen of the United States, residing at the city of Spokane, in the county of Spokane and State of Washington, have invented a new and useful Exposure-Index for Photographic-Plate Holders, of which the following is a specification.

My invention relates to an improvement in photography attached to the plate-holder operated in the photographic camera; and the object of said improvement is to show automatically to the operator of the camera whether or not a sensitive plate has once been exposed and a negative taken, so as to avoid spoiling the negative by a second exposure through forgetfulness of the operator. I attain this object by the mechanism illustrated in the accompanying drawings, in which—

Figures 1, 3:
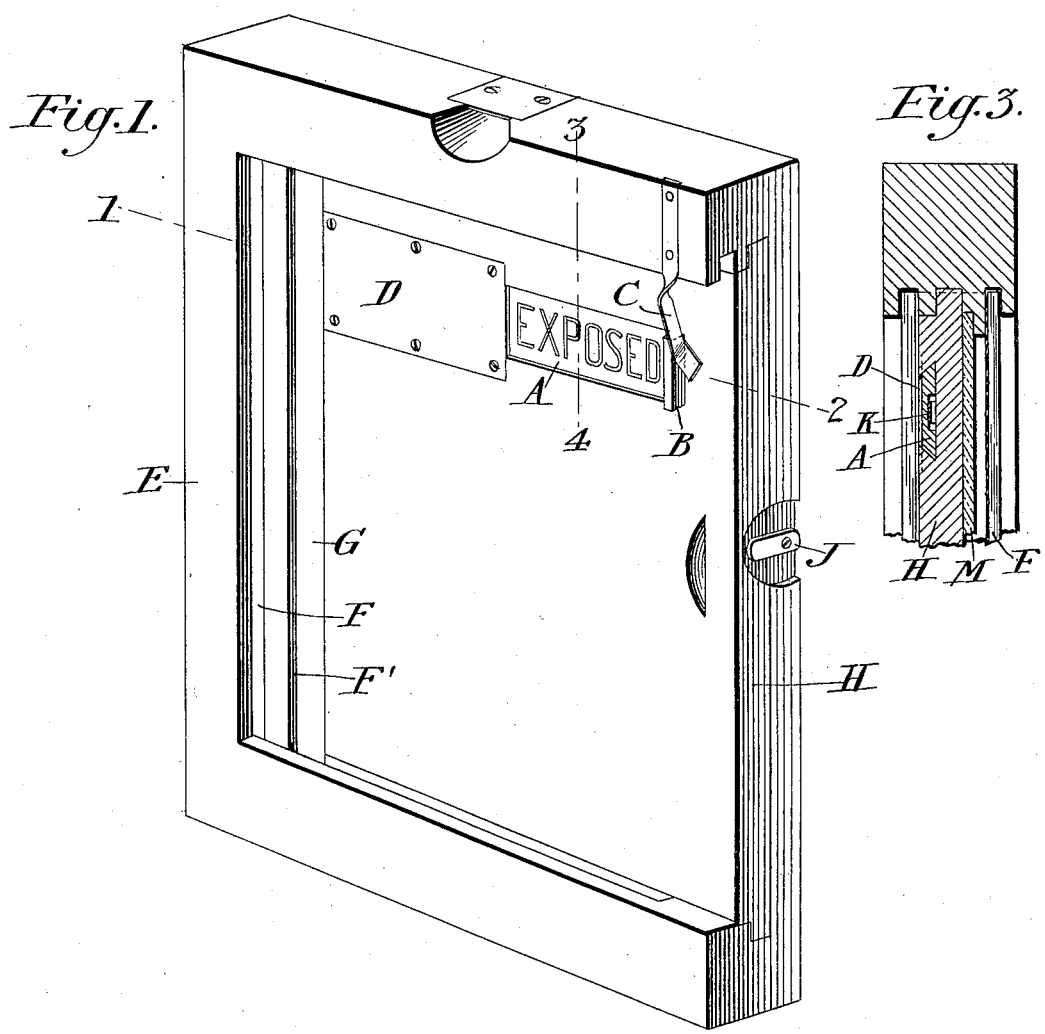
Figure 2:
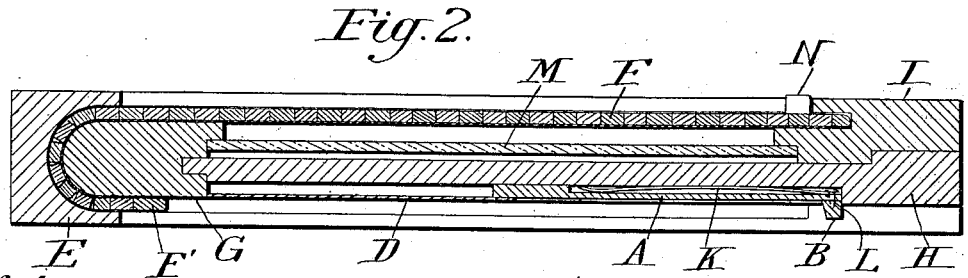

Figure 1 is a detailed view in perspective of the improvement for which patent is applied for and the plate-holder to which it is attached. Fig. 2 is a horizontal cross-section on the line 1 2, Fig. 1; and Fig. 3 is a vertical cross-section on the line 3 4, Fig. 1. Fig. 1 is on the scale substantially of two-thirds of an inch to the inch, and Figs. 2 and 3 are full size for cabinet-plate holder taking four and one-fourth by six and one-half plate.

Similar letters refer to similar parts throughout the several views.

The plate-holder, Fig. 1, to which my invention is attached, is a rectangular frame for the reception of sensitive plates preparatory to taking a negative by means of the camera. It is readily adjustable to the rear of the camera and as readily removable therefrom. On each side is a slide each impervious to light, slide H being a common board slide and slide F F' being a curtain-slide. The sensitive plate M when adjusted lies between them, Fig. 2, and is adjusted by withdrawing slide H, (to right in Figs. 1 and 2,) inserting the plate, replacing slide H, and keeping it in place by turning button J, Fig. 1. When the plate-holder is ready to adjust to the camera, slides H and F F' and plate M are all in precisely the position shown in Fig. 2.

When the plate-holder is adjusted to the camera, curtain-slide F F' is nearest the lens, between it and the plate M. For an exposure the plate-holder is slid immediately back of the lens, and at the same time curtain-slide is caught by a rod at prominence N, Fig. 2, and forced to slide back over axis G, Fig. 2, clear of plate M, the end F' moving forward to point where prominence B appears in Fig. 2. The shutter in front of the lens is thrown open, the plate exposed. When exposure is complete, the shutter is thrown back in front of the lens, the plate-holder is pushed back to its former position in the camera, slide F F' thus forced back to its former position in front of the negative, and the plate-holder removed from camera for the purpose of taking out the negative.

The above description of the plate-holder and its operation forms no part of my invention, but is merely for the purpose of giving a clear understanding of my invention, which is attached thereto and described as follows: The slide A runs back and forth in a beveled groove from the position shown in Figs. 1 and 2 to a position underneath the plate D, where it is entirely concealed, excepting the slight prominence B, which when A is concealed under plate D rests against the edge of the plate. Underneath the slide A is a small spring K, Figs. 2 and 3, which keeps the slide pressed up against the sides of the grooves, so that it will maintain a stationary position unless force is used to move it backward or forward. This spring is fastened to the slide at one end by a small screw L. All the parts A, B, D, K, and L are attached to slide H. A steel spring C is attached to the upper part of the permanent frame of the plate-holder, Fig. 1.

My invention is operated as follows: When the plate-holder containing a sensitive plate is adjusted to the camera ready for exposure, index A is concealed under plate D. As before explained, when the operator makes an exposure curtain-slide F F' is drawn back over axis G, the end F' strikes prominence B and carries forward index A from under plate D, so as to show the word "Exposed" thereon, as in Figs. 1 and 2. When curtain-slide F F' is drawn back after exposure, index A is held in position by spring K and shows to operator that the plate has been exposed and negative taken. The plate-holder is then removed from camera and the negative removed by turning button J and withdrawing slide H. As H is withdrawn prominence B strikes against the lower part of spring C, Fig. 1, and index A is forced back under plate D entirely out of sight, and as B strikes end of plate D spring C is forced over B and left free, as before.

When slide H is replaced in the plate-holder after insertion of a new plate for another exposure, the extreme end of spring C is so bent, Fig. 1, as to present an inclined plane to prominence B, so that B slides under the end of C, pushing up the spring and passing beyond without causing index A to be moved from the position under plate D. However much slide H is withdrawn and replaced after first withdrawal as above, index A, because of peculiar construction of spring C, will always remain under plate D, so as to conceal the word "Exposed" until withdrawn by curtain F F' upon an exposure, as before described.

What I claim as my invention, and desire to secure by Letters Patent, is—

1. In an exposure-index for photographic-plate holders, the combination of index A with its spring K, fastened by screw L, plate D under and out from which the index slides back and forth and spring C all substantially as above described.

2. In an exposure-index for photographic-plate holders the combination of index A with curtain-slide F F' and with spring C substantially as above described for the purposes above specified.

HENRY G. ROSSLOW.

Witnesses:
R. C. HYDE,
M. B. FISHER.